US011308701B2

(12) United States Patent
Shin et al.

(10) Patent No.: US 11,308,701 B2
(45) Date of Patent: Apr. 19, 2022

(54) RENDERING AUGMENTED REALITY IMAGE INCLUDING VIRTUAL OBJECT WITH SURFACE SHOWING REFLECTION OF ENVIRONMENT

(71) Applicant: SK Telecom Co., Ltd., Seoul (KR)

(72) Inventors: Seungho Shin, Seoul (KR); Jinsoo Jeon, Seoul (KR); Gukchan Lim, Seoul (KR); Ikhwan Cho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/862,990

(22) Filed: Apr. 30, 2020

(65) Prior Publication Data

US 2020/0258312 A1    Aug. 13, 2020

Related U.S. Application Data

(63) Continuation of application No. PCT/KR2018/013113, filed on Oct. 31, 2018.

(30) Foreign Application Priority Data

Oct. 31, 2017  (KR) .................. 10-2017-0143267

(51) Int. Cl.
*G06T 19/00* (2011.01)
*G06T 7/55* (2017.01)
(Continued)

(52) U.S. Cl.
CPC ............ *G06T 19/006* (2013.01); *G06T 7/529* (2017.01); *G06T 7/55* (2017.01); *G06T 15/04* (2013.01)

(58) Field of Classification Search
None
See application file for complete search history.

(56) References Cited

U.S. PATENT DOCUMENTS 6,639,594 B2    10/2003  Zhang et al.
6,983,082 B2    1/2006   Duiker
(Continued)

FOREIGN PATENT DOCUMENTS

JP          4220470 B2      2/2009
KR    10-2013-0112578 A    10/2013
(Continued)

OTHER PUBLICATIONS

Sadeghi et al.;"Poisson Local Color Correction for Image Stitching;" In Proceedings of the Third International Conference on Computer Vision Theory and Applications, pp. 275-282 (Year: 2008).*

(Continued)

*Primary Examiner* — Edward Martello
(74) *Attorney, Agent, or Firm* — Fenwick & West LLP (57) ABSTRACT

In accordance with an aspect of the present disclosure, there is provided a method for processing image performed by image processing device for rendering an augmented reality image. The method comprises, acquiring a first real image corresponding to a first direction from the image processing device, acquiring a second real image corresponding to a second direction, different from the first direction, from the image processing device, determining reflectivity of a surface of a virtual object in the augmented reality image; and rendering, according to the reflectivity, the surface of the virtual object by using an environment texture, the environment texture generated based on the first real image and the second real image.

9 Claims, 10 Drawing Sheets

(51) Int. Cl.
*G06T 7/529* (2017.01)
*G06T 15/04* (2011.01)

(56) References Cited

U.S. PATENT DOCUMENTS

| | | | |
|---|---|---|---|
| 8,687,001 B2 | 4/2014 | Shim | |
| 8,768,098 B2 * | 7/2014 | Zhang | G06T 3/4038 |
| | | | 382/294 |
| 9,716,842 B1 * | 7/2017 | Worley | G09G 5/377 |
| 2009/0251460 A1 * | 10/2009 | Dunnigan | G06T 15/50 |
| | | | 345/419 |
| 2010/0315415 A1 * | 12/2010 | Asami | A63F 13/10 |
| | | | 345/419 |
| 2015/0371447 A1 | 12/2015 | Yasutake | |
| 2018/0035047 A1 * | 2/2018 | Lei | G02B 13/06 |

FOREIGN PATENT DOCUMENTS

| | | |
|---|---|---|
| KR | 10-1671185 B1 | 11/2016 |
| WO | WO 2004/047426 A2 | 6/2004 |

OTHER PUBLICATIONS

PCT International Search Report, PCT Application No. PCT/KR2018/013113, dated Mar. 9, 2019, five pages.

Ropinski, T. et al., "Virtual Reflections for Augmented Reality Environments", Int. Conference on Artificial Reality and Telexistence, Nov. 29, 2006, pp. 1-13.

\* cited by examiner

RENDERING AUGMENTED REALITY IMAGE INCLUDING VIRTUAL OBJECT WITH SURFACE SHOWING REFLECTION OF ENVIRONMENT

CROSS-REFERENCE TO RELATED APPLICATION

This application is a bypass continuation application of PCT International Application No. PCT/KR2018/013113 filed on Oct. 31, 2018, which claims priority to Korean Patent Application No. 10-2017-0143267, filed on Oct. 31, 2017, the entire contents of which are incorporated herein by reference.

TECHNICAL FIELD

The present disclosure relates to an image processing method of displaying an AR (Augmented Reality) image including a virtual object on a background image and an image processing device therefor.

BACKGROUND

Augmented reality technologies providing unique effects by expressing a virtual object on a real-world background image delude a user that the virtual object exists in a real world.

In the augmented reality technologies, to enhance a sense of reality for an augmented reality image, rendering that the virtual object reflects a surrounding real-world environment is performed. As a technology that the augment reality image reflects the surrounding environment, there is environment mapping allowing the user to easily look around the surrounding real-world environment in a fixed point of sight. As a technique providing the sense of reality by using texture mapping onto an image, the environment mapping indicates a phenomenon that an object including a reflective surface reflects the surrounding environment.

According to prior arts, to express the surrounding environment, a role of a virtual observer is provided for a reflective object, and a part of an environment map intersected with a point of sight of the virtual observer is expressed through two-dimensional projection.

However, in the prior arts, since only a limited real image, acquired by the user, in front of the user whose point of sight directs the background image in the augmented reality image is used for the environment mapping, there is a limitation to enhance the sense of the reality for the augmented reality image.

For example, when a mobile device including a back-facing camera displays the augmented reality image on a screen, only a rear real image captured by the back-facing camera is used as an environment texture. Therefore, only real objects located behind the mobile device is rendered to be projected onto a surface of the virtual object according to reflectivity for the surface of the virtual object. However, in the real world, if the user looks at the real object with a reflective surface, the user as well as surrounding objects can be projected onto the real object. According to the prior arts, since the user is not projected onto the surface of the virtual object in the augmented reality image, the user recognizes that the augmented reality image is different from a real-world environment, which works as a factor for the user to recognize that the sense of the reality of the augmented reality image is low.

SUMMARY

According to embodiments of the present disclosure, an image processing method and an image processing device therefor are provided, the method and the device rendering a surface of a virtual object in a virtual reality image by using an environment texture generated based on not only a real image according to a point of sight of a user but also another real image in a different direction from the point of sight.

In accordance with an aspect of the present disclosure, there is provided a method for processing image performed by image processing device for rendering an augmented reality image. The method comprises, acquiring a first real image corresponding to a first direction from the image processing device, acquiring a second real image corresponding to a second direction, different from the first direction, from the image processing device, determining reflectivity of a surface of a virtual object in the augmented reality image; and rendering, according to the reflectivity, the surface of the virtual object by using an environment texture, the environment texture generated based on the first real image and the second real image.

In accordance with another aspect of the present disclosure, there is provided an image processing device. The image processing device comprises, an image acquisition unit configured to acquire a first real image corresponding to a first direction from the image processing device and a second real image corresponding to a second direction, different from the first direction, from the image processing device, a storage unit configured to store three-dimensional model data corresponding to a virtual object in an augmented reality image, and a control unit, and wherein the control unit, determines, for the virtual object in the augmented reality image, reflectivity of a surface of the virtual object based on the three-dimensional model data, and renders, according to the reflectivity, the surface of the virtual object by using an environment texture generated based on the first real image and the second real image.

According to embodiments of the present disclosure, the surface of the virtual object in the virtual reality image is rendered by using the environment texture generated based on not only the real image according to the point of sight of the user but also the another real image in the different direction (such as an opposite direction) from the point of sight. Therefore, there is an effect that a sense of reality for the augmented reality image the user recognizes improves compared to prior arts.

For example, if a mobile device including a front-facing camera and a back-facing camera displays the augmented reality image on a screen, the virtual reality image is rendered by using the environment texture generated based on a front real image captured by the front-facing camera as well as a rear real image captured by the back-facing camera. Therefore, not only a real object behind the mobile device but also the user in front of the mobile device may be rendered to be projected onto the surface of the virtual object. In other words, the augmented reality image is displayed similar to a real environment and thus the user recognizes that the sense of reality for the augmented reality image is high.

DETAILED DESCRIPTION

Figure 1:
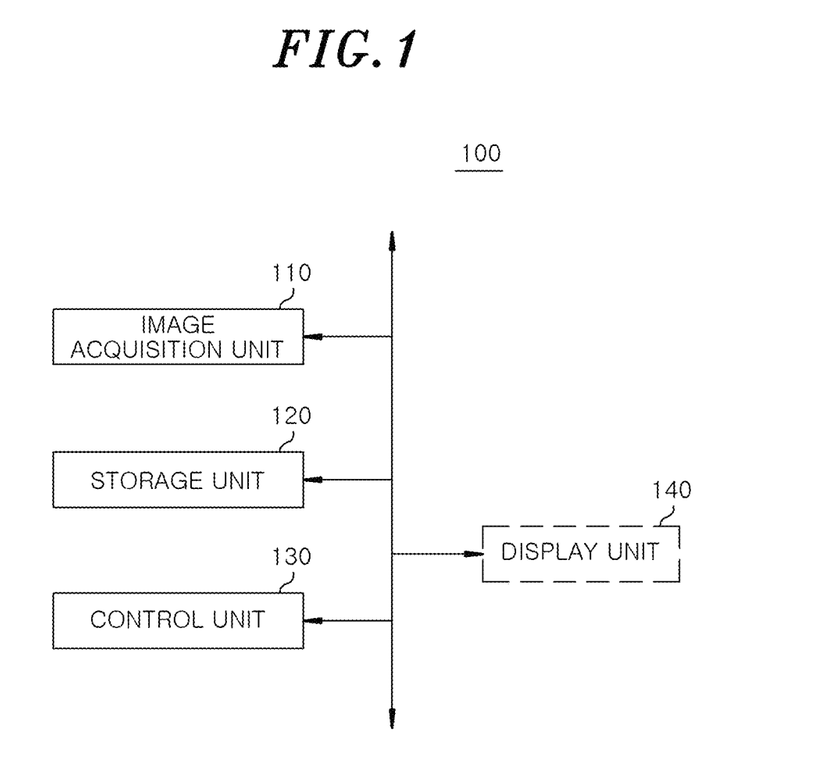
FIG. 1 shows a block diagram of an image processing device according to one embodiment of the present disclosure.

As illustrated in FIG. 1, the image processing device 100 according to the one embodiment includes an image acquisition unit 110, a storage unit 120, a control unit 130, and a display unit 140.

The image acquisition unit 110 acquires a first real image corresponding to a first direction from the image processing device 100 and a second real image corresponding to a second direction from image processing device 100 that is different from the first direction. For example, the image acquisition unit 110 may acquire the first real image and the second real image which correspond to opposite directions. For example, the image processing device 100 may be implemented as a smartphone including a front-facing camera and a back-facing camera which may perform functions of the image acquisition unit 110. Otherwise, the image acquisition unit 110 may include a communication interface capable of receiving information from a separate camera from the image processing device 100. In this case, the first real image and the second real image are generated by the separate camera and the image acquisition unit 110 may acquire the first real image and the second real image through the communication interface.

Computer executable instructions, when executed by the control unit 130, causing the control unit 130 to perform a process generally controlling the image processing method are stored in the storage unit 120. Further, three-dimensional model data corresponding to a virtual object and avatar data to be displayed in an augmented reality image may be stored in the storage unit 120. Furthermore, the first real image and the second real image which are acquired by the image acquisition unit 110 may be stored in the storage unit 120. For example, the storage unit 120 may include a computer-readable storage medium that is at least one type of a memory which is a flash memory type, a hard disk type, a MMC (Multi-Media Card) micro type, or a card type, a RAM (Random Access Memory), and a ROM (Read Only Memory).

The control unit 130 performs a process generally controlling an augmented reality displaying procedure by executing the computer executable instructions stored in the storage unit 120. According to the process, for the virtual object in the augmented reality image, reflectivity for a surface of the virtual object is determined, and the surface of the virtual object is rendered by using an environment texture generated, according to the reflectivity, based on the first real image and the second real image. The control unit 130 may allow the first real image to be projected onto an area of the virtual object and the second real image to be projected onto another area of the virtual object.

When the control unit 130 renders the surface of the virtual object, the control unit 130 sets an image connection area including sides where at least one side of the first real image and at least one side of the second real image abut on, and diffuses color of the image connection area to the first real image and the second real image. For example, the control unit 130 may determine color to be diffused based on a Poisson Equation into which the color of the image connection area is input or based on a Blur operation applied to the color of the image connection area.

Further, when setting the image connection area between the first real image and the second real image, the control unit 130 may generate a first mirror image by mirroring the first real image along a left side or a right side of the first real image as a vertical axis. Next, the control unit 130 may generate a second mirror image by mirroring the first real image along a top side or a bottom side of the first real image as a horizontal axis. In this case, the control unit 130 may position a side of one of the first real image, the first mirror image, and the second mirror image next to each side of the second real image, and set a plurality of image connection areas each including each side of the second real image. Furthermore, when setting the image connection area between the first real image and the second real image, the control unit 130 may generate a third mirror image by mirroring the second real image along a left side or a right side of the second real image as the vertical axis. Next, the control unit 130 may generate a fourth mirror image by mirroring the second real image along a top side or a bottom side of the second real image as the horizontal axis. In this case, the control unit 130 may position a side of one of the second real image, the third mirror image, and the fourth mirror image next to each side of the second real image, and set a plurality of image connection areas each including a side of the first real image.

Further, when rendering the surface of the virtual object, the control unit 130 may generate a reality modified image rendered by overlaying, on the second real image, an avatar corresponding to a face object if the face object is included among real object in the second real image, and use the first real image and the reality modified image as the environment texture. For example, the control unit 130 may include a processor such as a CPU (Central Processing Unit) or a GPU (Graphics Processing Unit) and the like.

The display unit 140 displays, according to control signals based on results of processes performed by the control unit 130, the augmented reality image including the rendered virtual object. Since the display unit 140 may be embodied as an extra device apart from the image processing device 100, the display unit 140 is illustrated as dotted lines in FIG. 1. For example, the display unit 140 may include a flat panel display component such as LCD (Liquid Crystal Display) and so on.

Figure 2:
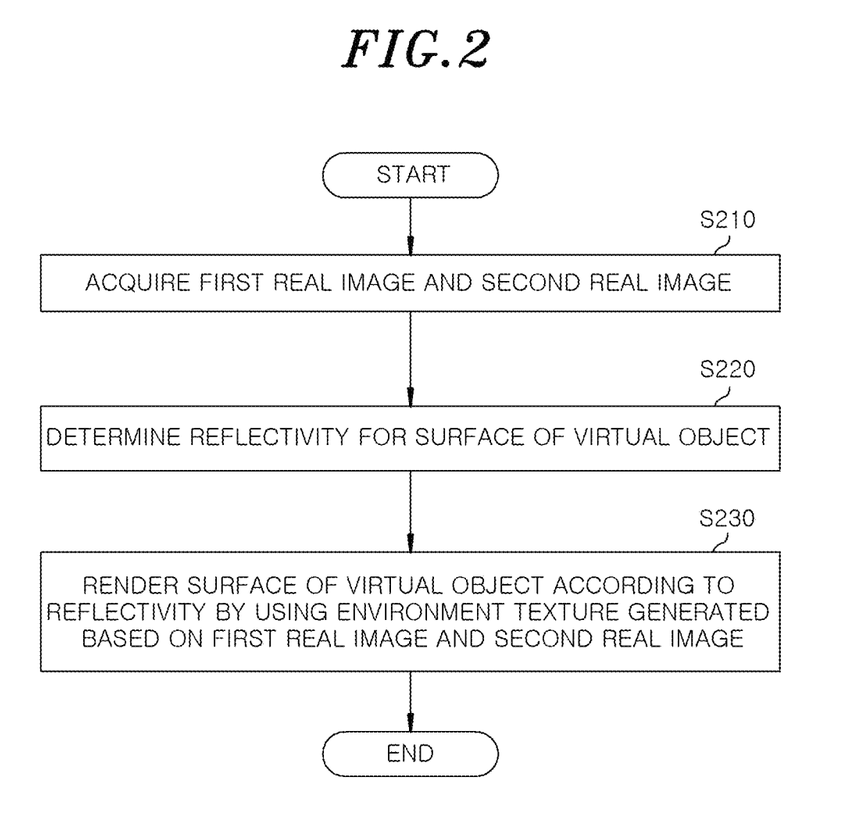
FIG. 2 shows a flowchart illustrating an image processing method performed by an image processing device according to one embodiment of the present disclosure.

FIG. 2 shows a flowchart illustrating an image processing method performed by the image processing device 100 according to one embodiment of the present disclosure.

As illustrated in FIG. 2, in a step S210, the image processing method according to the one embodiment acquires a first real image corresponding to a first direction from the image processing device 100 and a second real image corresponding to a second direction, that is different from the first direction, from the image processing device 100. Next, in a step S220, the image processing method according to the one embodiment determines, for a virtual object in an augmented reality image, reflectivity for a surface of the virtual object. Next, in a step S230, the image processing method according to the one embodiment renders the surface of the virtual object by using an environment texture generated, according to the determined reflectivity, based on the first real image and the second real image.

Figure 3:
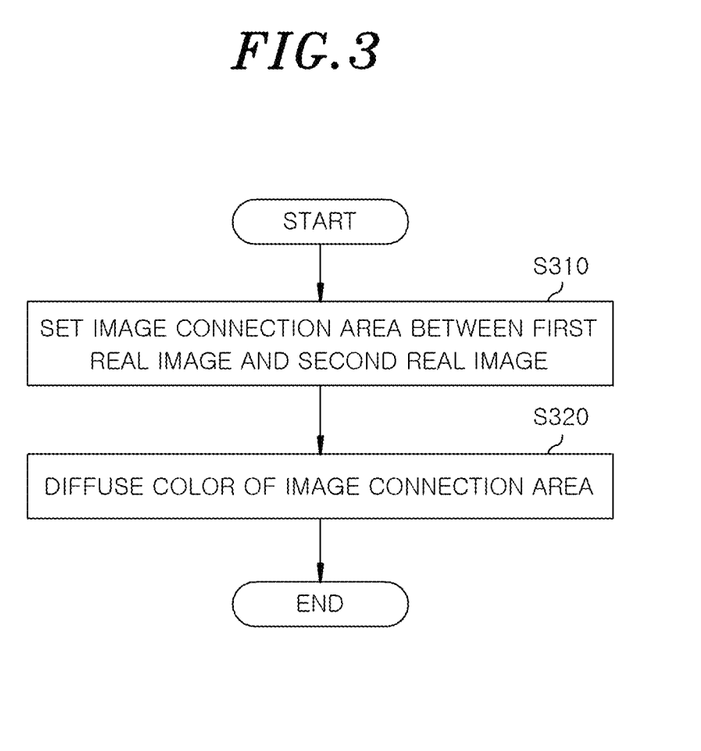
FIG. 3 shows a flowchart illustrating a step rendering a surface of a virtual object of an image processing method performed by an image processing device according to one embodiment of the present disclosure.

FIG. 3 shows a flowchart illustrating a step rendering a surface of a virtual object of an image processing method performed by the image processing device 100 according to one embodiment of the present disclosure.

As illustrated in FIG. 3, in a step S310, the step rendering the surface of the virtual object of the image processing method according to the one embodiment includes setting image connection area including sides where at least one side of a first real image and at least one side of a second real image abut on. Next, in a step S320, the step rendering the surface of the virtual object of the image processing method according to the one embodiment diffuses color of the image connection area between the first real image and the second real image.

Figure 4:
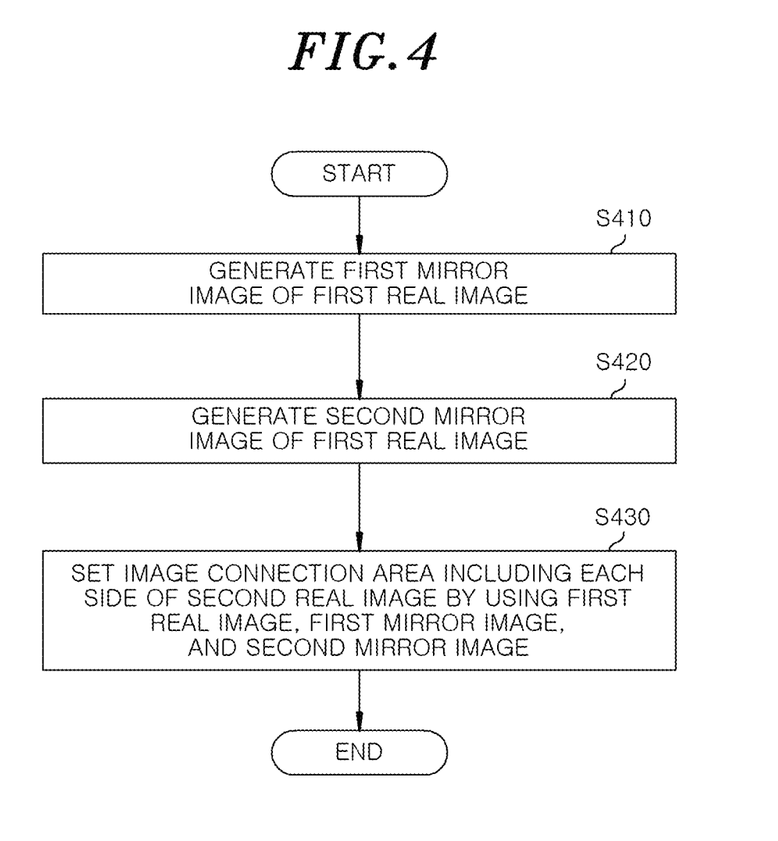
FIG. 4 shows a flowchart illustrating a step setting an image connection area of an image processing method performed by an image processing device according to one embodiment of the present disclosure.

FIG. 4 shows a flowchart illustrating a step setting an image connection area of an image processing method performed by the image processing device 100 according to one embodiment of the present disclosure.

As illustrated in FIG. 4, in a step S410, the step setting the image connection area of the image processing method according to the one embodiment generates a first mirror image by mirroring a first real image along a left side or a right side of the first real image as a vertical axis. Next, in a step S420, the step setting the image connection area of the image processing method according to the one embodiment generates a second mirror image by mirroring a first real image along a top side or a bottom side of the first real image as a horizontal axis. Next, in a step S430, the step setting the image connection area of the image processing method according to the one embodiment positions a side of one of the first real image, the first mirror image, and the second mirror image next to each side of the second real image, and sets a plurality of image connection areas each including a side of the second real image.

Figure 5:
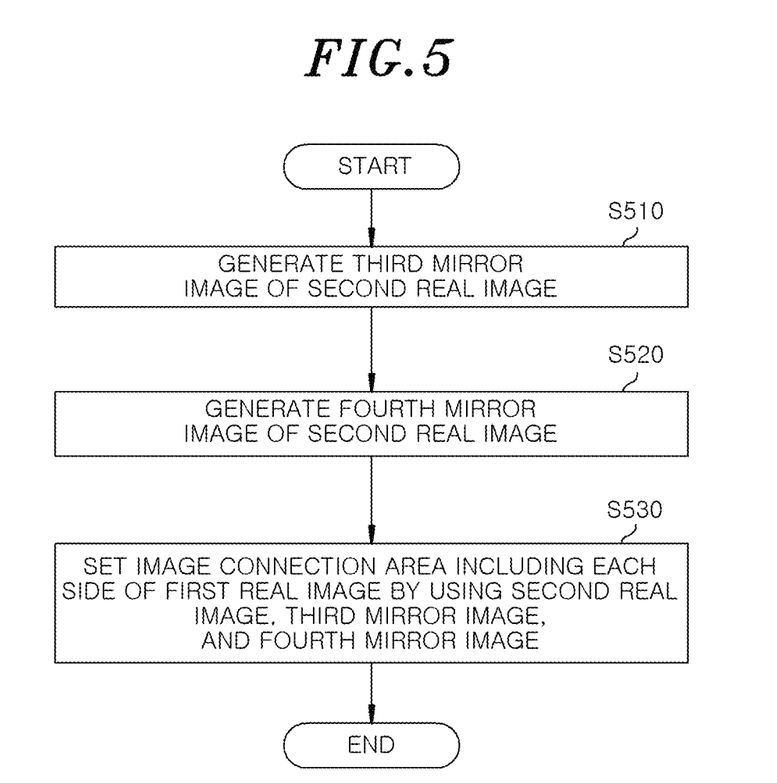
FIG. 5 shows a flowchart illustrating a step setting an image connection area of an image processing method performed by an image processing device according to another embodiment of the present disclosure.

FIG. 5 shows a flowchart illustrating a step setting an image connection area of an image processing method performed by the image processing device 100 according to another embodiment of the present disclosure.

As illustrated in FIG. 5, in a step S510, the step setting the image connection area of the image processing method according to the another embodiment generates a third mirror image by mirroring a second real image along a left side or a right side of the second real image as a vertical axis. Next, in a step S520, the step setting the image connection area of the image processing method according to the another embodiment generates a fourth mirror image by mirroring the second real image along a top side or a bottom side of the second real image as a horizontal axis. Next, in a step S530, the step setting the image connection area of the image processing method according to the another embodiment positions a side of one of the second real image, the third mirror image, and the fourth mirror image next to each side of the first real image, and sets a plurality of image connection areas each including a side of the first real image.

Hereinafter, referring to FIG. 1 through FIG. 5, the image processing method performed by the image processing device 100 according to one embodiment of the present disclosure is described in more detail.

At first, in the step S210, the image acquisition unit 110 acquires a first real image corresponding to a first direction from the image processing device 100 and a second real image corresponding to a second direction, that is different from the first direction, from the image processing device 100. For example, if the image processing device 100 is implemented as a smartphone including a front-facing camera and a back-facing camera, the first real image may be acquired by running the back-facing camera and the second real image may be acquired by running the front-facing camera that faces an opposite direction to the back-facing camera.

Next, in the step S220, the control unit 130 determines reflectivity for a surface of a virtual object that is to be included in a virtual reality image. For example, information on the reflectivity for the surface of the virtual object may be included in three-dimensional model data of the virtual object stored in the storage unit 120, and, in this case, the control unit 130 may acquire, from the three-dimensional model data, the information on the reflectivity for the surface of the virtual object. Further, the control unit 130 may perform, in advance, machine learning on big data including information on virtual objects and reflectivity for a surface of each virtual object, and deduce the reflectivity for the surface of the virtual object that is to be included in the virtual reality image based on the result of the machine learning performed regarding the reflectivity for the surface of the each virtual object. In this case, the information on the reflectivity for the surface of the virtual object may be provided for a user to confirm whether the reflectivity deduced based on the machine learning is correct, and if there is an error on the deduction, an additional function may be provided for the user to directly modify the result of the deduction.

Figure 7A:
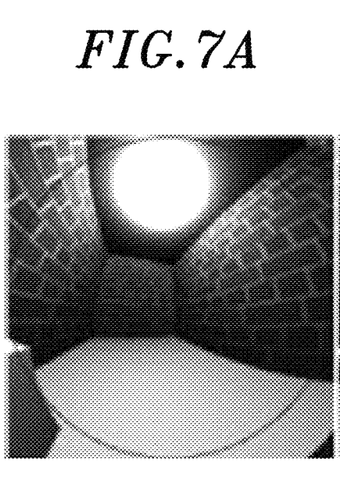
FIGS. 7A-7C shows a virtual reality image output according to an image processing method performed by an image processing device according to one embodiment of the present disclosure.
Figure 7B:
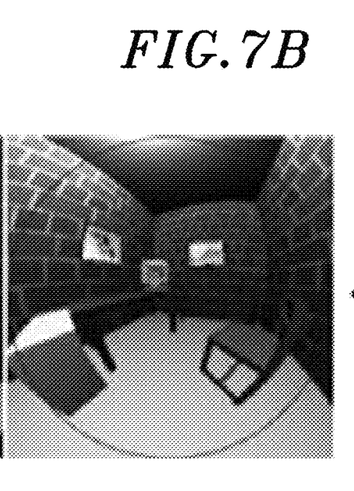
Figure 7C:
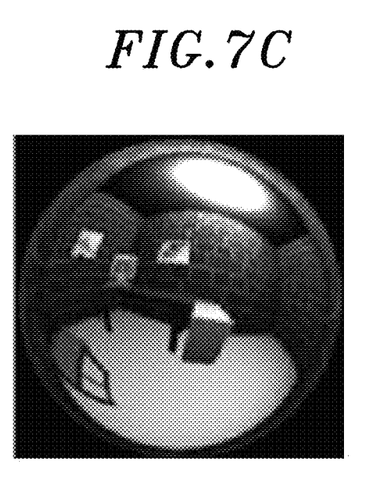

Next, in the step S230, the control unit 130 renders, according to the reflectivity for the surface of the virtual object determined in the step S220, the surface of the virtual object by using an environment texture generated based on the first real image and the second real image. For example, referring to FIGS. 7A-7C, in case of acquiring a first real image as illustrated in FIG. 7A and a second real image as illustrated in FIG. 7B, if an environment texture generated based on the first real image and the second real image is used, the first real image is projected onto a part of a surface of a virtual object and the second real image is projected onto another part of the surface of the virtual object as illustrated in FIG. 7C. In this case, the control unit 130 may control that the first real image is projected onto an edge area of the virtual object and the second real image is projected onto a center area of the virtual object if the virtual object is spherical.

If the first real image reflected from the part of the virtual object and the second real image reflected from the another part of the virtual object have disparity in color so that a boundary line between the part of the virtual object and the another part of the virtual object is appeared, the user recognizes that a sense of reality of an augmented reality image is low because it is different from a reflection occurred in a real. Therefore, it is needed that an image connection area between the first real image and the second real image which are to be projected onto the surface of the virtual object is set, and the first real image and the second real image are naturally mixed in the set image connection area. At first, for the above description, the image connection area between the first real image and the second real image may be set, more specifically, the image connection area for the first real image and the image connection area for the second real image may be set respectively as illustrated in FIG. 4 and FIG. 5.

Figure 8:
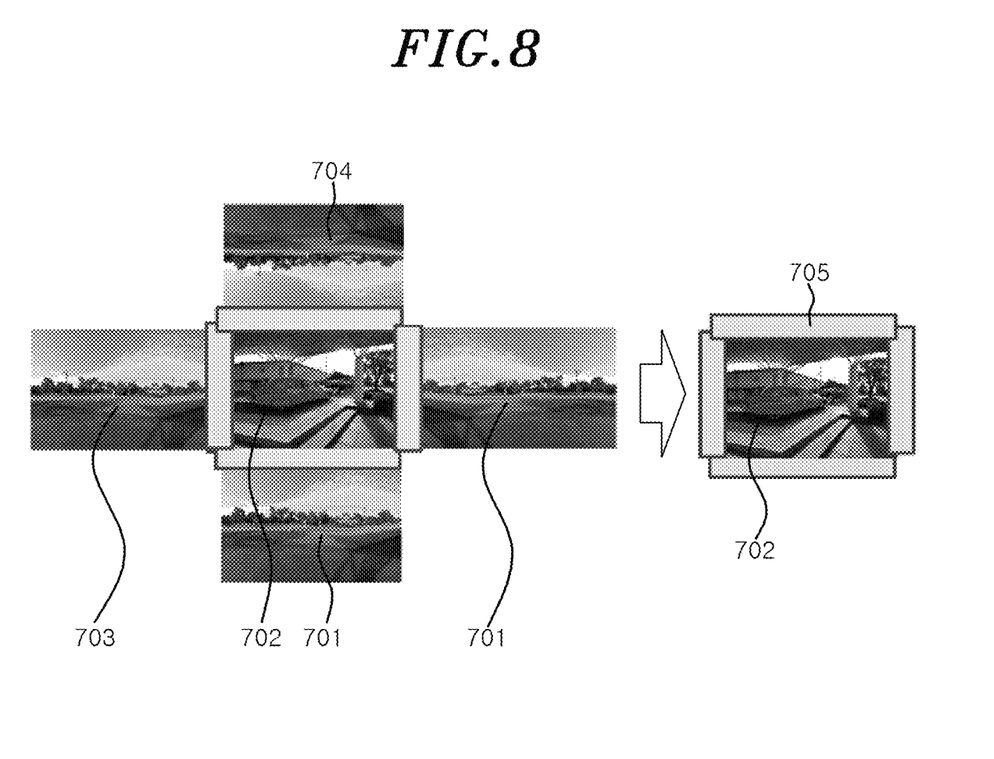
FIG. 8 illustrates a step setting an image connection area of an image processing method performed by an image processing device according to one embodiment of the present disclosure.

Referring to FIG. 4 and FIG. 8, in the step S410, by mirroring a first real image 701 along a left side of a right side of the first real image 701 as a vertical axis, a first mirror image 703 is generated. Next, in the step S420, by mirroring the first real image 701 along a top side or a bottom side of the first real image 701 as a horizontal axis, a second mirror image 704 is generated. Further, in the step S430, by positioning a side of one of the first real image 701, the first mirror image 703, and the second mirror image 704 next to each side of a second real image 702, a plurality of image connection areas 705 each including a side of the second real image 702 are set.

Figure 9:
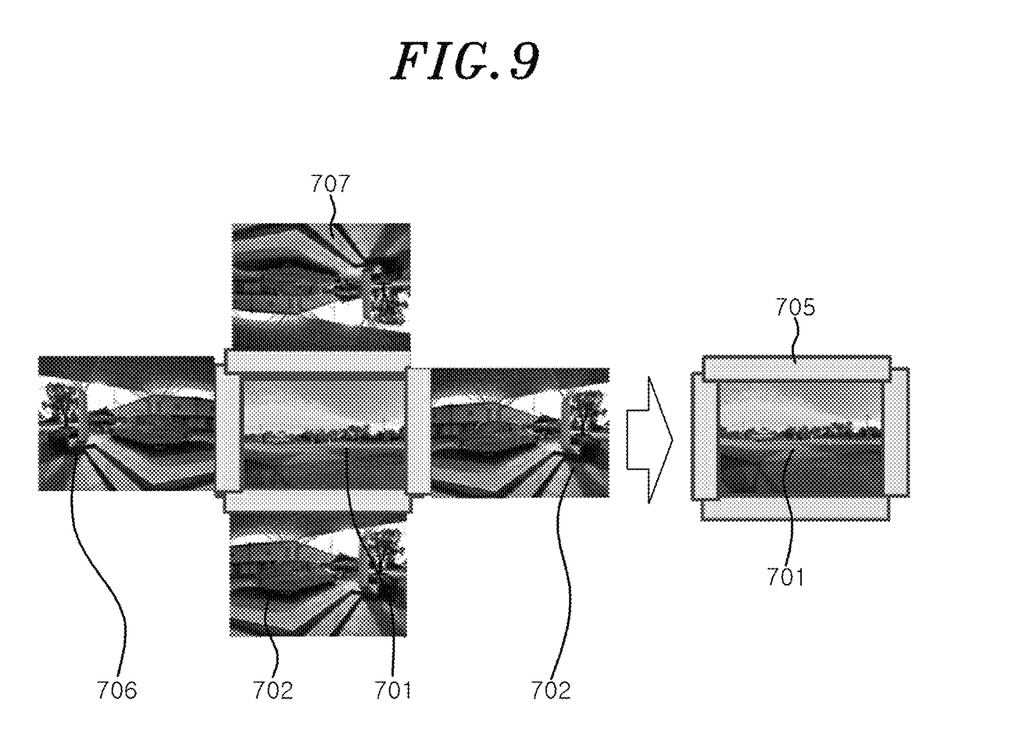
FIG. 9 illustrates a step setting an image connection area of an image processing method performed by an image processing device according to another embodiment of the present disclosure.

Referring the FIG. 5 and FIG. 9, in the step S510, by mirroring the second real image 702 along a left side of a right side of the second real image 702 as a vertical axis, a third mirror image 706 is generated. Next, in the step S520, by mirroring the second real image 702 along a top side or a bottom side of the second real image 702 as a horizontal axis, a fourth mirror image 707 is generated. Further, in the step S530, by positioning a side of one of the second real image 702, the third mirror image 706, and the fourth mirror image 707 next to each side of the first real image 701, a plurality of image connection areas 705 each including a side of the first real image 701 are set.

As previously described, in the step S310, the image connection area 705, including sides where at least one side of the first real image 701 and at least one side of the second real image 702 abut on is set.

Then, in the step S320, the control unit 130 performs, for the first real image 701 and the second real image 702, a process diffusing color of the image connection area 705. In this case, the control unit 130 may determine color to be diffused based on a Poisson equation into which the color of the image connection area 705 is input, or a Blur operation applied to the color of the image connection area 705.

Through above descriptions, the first real image 701 and the second real image 702 whose color corresponding to the image connection area 705 is diffused in the step S320 are acquired, and the control unit 130 renders, according to the reflectivity for the surface of the virtual object determined in the step S220, the surface of the virtual object by using the environment texture generated based on the first real image 701 and the second real image 702, and the display unit 140 displays the augmented reality image including the virtual object rendered by the control unit 130. Then, since the color between the part of the virtual object onto which the first real image 701 is projected and the another part of the virtual object onto which the second real image 702 is projected is diffused, the boundary line is not appeared and thus the sense of the augmented reality image improves.

Figure 6:
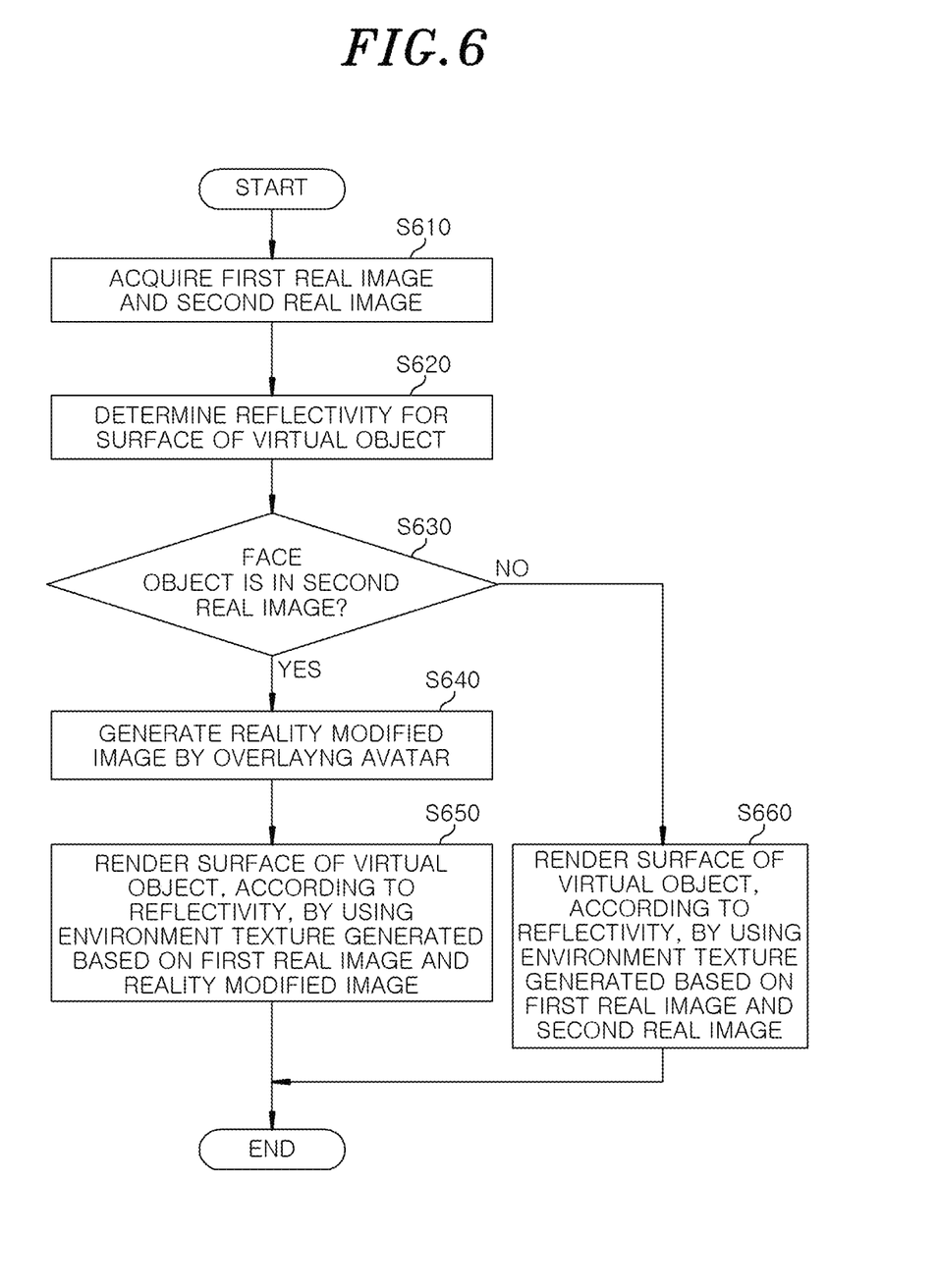
FIG. 6 shows a flowchart illustrating an image processing method performed by an image processing device according to another embodiment of the present disclosure.

FIG. 6 shows a flowchart illustrating an image processing method performed by the image processing device 100 according to another embodiment of the present disclosure.

As illustrated in FIG. 6, in a step S610, the image processing method according to the another embodiment acquires a first real image corresponding to a first direction from the image processing device 100 and a second real image corresponding to a second direction, that is different from the first direction, from the image processing device 100. Next, in a step S620, the image processing method according to the another embodiment determines, for a virtual object in an augmented reality image, reflectivity for a surface of the virtual object. Next, in steps S630 and S640, if real object in the second real image include a face object, the image processing method according to the another embodiment generates reality modified image rendered by overlaying an avatar corresponding to the face object on the second real image. Further, the image processing method according to the another embodiment renders, according to the determined reflectivity, the surface of the virtual object either by using, in a step S650, an environment texture generated based on the first real image and the reality modified image or by using, in a step S660, an environment texture generated based on the first real image and the second real image.

Comparing the explanation for FIG. 6 to the explanation previously described in FIG. 2, the step S610, S620 and S660 correspond to the step S210, S220, and S230 respectively. Therefore, a detailed description thereof is omitted herein.

The another embodiment of FIG. 6 displays the avatar on the surface of the virtual object by rendering the avatar replaced from the face object if the real object in the second real image acquired in the step S610 include the face object. For example, if the image processing device 100 is implemented as a smartphone including a front-facing camera and a back-facing camera, the first real image may be acquired by running the back-facing camera, the second real image may be acquired by running the front-facing camera facing an opposite direction to the first real image, and the second real image may include a face of a smartphone user. In this case, the predetermined avatar rather than the face of the user is displayed on the surface of the visual object in the virtual reality image displayed on a screen of the smartphone.

Figure 10:
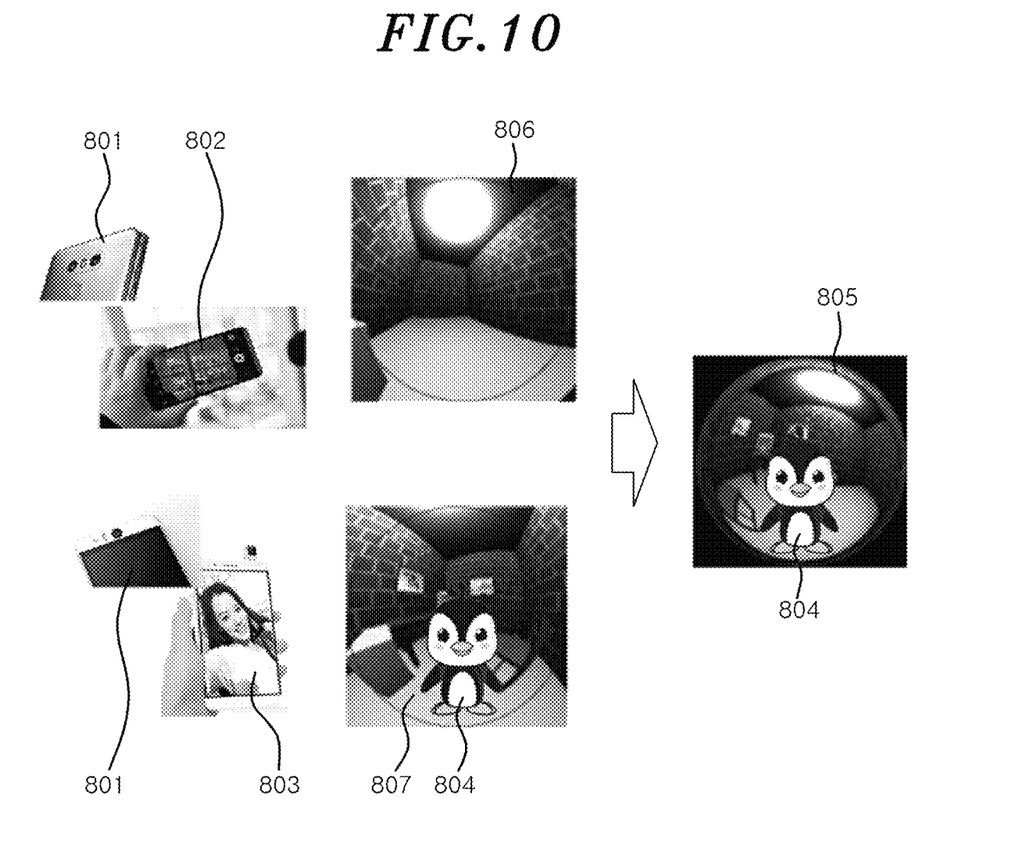
FIG. 10 shows a virtual reality image output according to an image processing method performed by an image processing device according to another embodiment of the present disclosure.

Referring to FIG. 6 and FIG. 10, in the step S610, a smartphone 801 implemented as the image acquisition unit 110 acquires a first real image 802 by running a back-facing camera and a second real image 803 by running a front-facing camera.

Then, in the step S630, the control unit 130 determines whether real object in the second real image 803 include a face object. For example, the control unit 130 may determine the face object by using a publicly known edge detection technique or the like.

Herein, in the step S640, in case of determining that the second real image 803 includes the face object, the control unit 130 reads avatar data stored in the storage unit 120 and generates the reality modified image that an avatar 804 covers the face object by overlaying the avatar data on the second real image 803.

Next, in the step S650, the control unit 130 renders, according to the reflectivity determined in the step S620, the surface of the virtual object by using the environment texture generated based on the first real image 802 and the reality modified image, and the display unit 140 displays an augmented reality image 805 including the avatar 804 rendered, by the control unit 130, on the surface of the spherical virtual object. In FIG. 10, an image 806 corresponds to a virtual reality image in case of projecting only the first real image 802 onto the spherical virtual object and an image 807 corresponds to a virtual reality image in case of projecting only a reality modified image generated from the second real image 803 onto the spherical virtual object.

As previously described, according to the embodiments of the present disclosure, the surface of the virtual object in the virtual reality image is rendered by using the environment texture generated based on not only the real image where perception of the user directs but also the another real image corresponding to the different direction (e.g. the opposite direction) from the real image. Therefore, the sense of the reality that the user recognizes for the augmented reality image improves compared to the prior arts.

For example, if the mobile device including the front-facing camera and the back-facing camera displays the augmented reality image on the screen, the virtual reality image is rendered by using the environment texture generated based on not only the rear real image captured by the back-facing camera but also the front real image captured by the front-facing camera. Therefore, the user in front of the mobile device as well as the real objects behind the mobile device may be rendered to be projected onto the surface of the virtual object. In other words, the augmented reality image is displayed similar to a real environment, and thus the user recognizes that the sense of the reality for the augmented reality image is high.

According to embodiments of the present disclosure, a surface of a virtual object in a virtual reality image is rendered by using an environment texture generated based on not only a real image where perception of a user directs but also another real image corresponding to a different direction (e.g. an opposite direction) from the real image.

The present disclosure may be widely used in a variety fields of augmented reality industries adopting augmented reality devices providing unique effects by displaying virtual objects in a real background image.

What is claimed is:

1. A method for processing an image performed by an image processing device for rendering an augmented reality image, the method comprising:
    acquiring a first real image corresponding to a first direction from the image processing device;
    acquiring a second real image corresponding to a second direction, different from the first direction, from the image processing device;
    determining reflectivity of a surface of a virtual object in the augmented reality image; and
    rendering, according to the reflectivity, the surface of the virtual object by using an environment texture, the environment texture generated by (i) projecting the first real image onto a center area of the virtual object, and (ii) projecting the second real image onto an edge area of the virtual object.

2. The method of claim 1, wherein the second direction is a direction opposite to the first direction.

3. The method of claim 1, wherein the rendering the surface of the virtual object includes,
    setting an image connection area including sides where at least one side of the first real image and at least one side of the second real image abut; and
    diffusing color of the image connection area to the first real image and the second real image.

4. The method of claim 3, wherein the diffusing the color of the image connection area comprises determining color to be diffused based on a Poisson Equation where the color of the image connection area is provided as an input to the Poisson Equation, or based on a Blur operation applied to the color of the image connection area.

5. The method of claim 3, wherein the setting the image connection area includes,
    generating a first mirror image by mirroring the first real image along a left side or a right side of the first real image as a vertical axis;
    generating a second mirror image by mirroring the first real image along a top side or a bottom side of the first real image as a horizontal axis; and
    setting a plurality of image connection areas including each side of the second real image, and
    wherein each side of the second real image abuts a side of one of (i) the first real image, (ii) the first mirror image and (iii) the second mirror image.

6. The method of claim 3, wherein the setting the image connection area includes,
    generating a third mirror image by mirroring the second real image along a left side or a right side of the second real image as a vertical axis;
    generating a fourth mirror image by mirroring the second real image along a top side or a bottom side of the second real image as a horizontal axis; and
    setting a plurality of image connection areas including each side of the first real image, and
    wherein each side of the first real image abuts a side of one of (i) the second real image, (ii) the third mirror image and (iii) the fourth mirror image.

7. The method of claim 1, wherein the rendering the surface of the virtual object includes,
    generating a reality modified image rendered by overlaying an avatar of a user on the second real image when an image of the user is included among the real objects in the second real image; and
    determining the first real image and the reality modified image as the environment texture.

8. A non-transitory computer-readable storage medium including computer executable instructions, wherein the instructions, when executed by a processor, cause the processor to perform a method for processing an image for rendering an augmented reality image, the method comprising:
    acquiring a first real image corresponding to a first direction;
    acquiring a second real image corresponding to a second direction, different from the first direction;
    determining reflectivity of a surface of a virtual object in the augmented reality image; and
    rendering, according to the reflectivity, the surface of the virtual object by using an environment texture, the environment texture generated by (i) projecting the first real image onto a center area of the virtual object, and (ii) projecting the second real image onto an edge area of the virtual object.

9. An image processing device, comprising:
    a processor; and
    memory storing instructions thereon, the instructions when executed by the processor cause the processor to:
        acquire a first real image corresponding to a first direction from the image processing device and a second real image corresponding to a second direction, different from the first direction, from the image processing device;
        astore three-dimensional model data corresponding to a virtual object in an augmented reality image;

determine, for the virtual object in the augmented reality image, reflectivity of a surface of the virtual object based on the three-dimensional model data; and render, according to the reflectivity, the surface of the virtual object by using an environment texture, the environment texture generated by (i) projecting the first real image onto a center area of the virtual object, and (ii) projecting the second real image onto an edge area of the virtual object.

* * * * *